(No Model.)
J. E. THOMAS & E. P. GROW.
AERATING DISTILLED WATER.
No. 502,409. Patented Aug. 1, 1893.
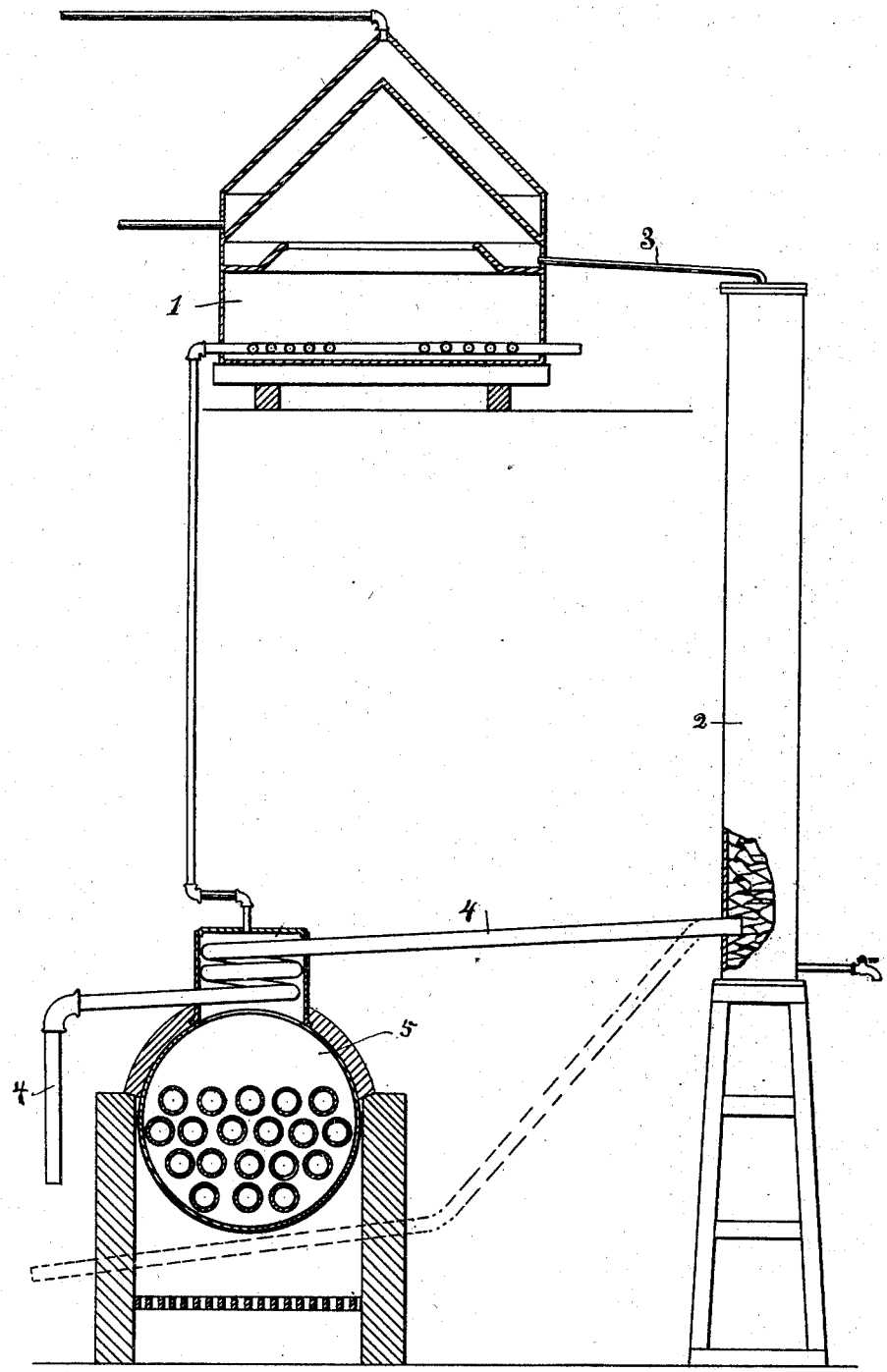
Attest.
J. N. Beckbissinger
Geo. J. Thomas
Inventors.
Elisha P. Grow
James E. Thomas.
By Jas E. Thomas Atty.

UNITED STATES PATENT OFFICE.

JAMES E. THOMAS AND ELISHA P. GROW, OF BAY CITY, MICHIGAN.

AERATING DISTILLED WATER.

SPECIFICATION forming part of Letters Patent No. 502,409, dated August 1, 1893.

Application filed January 31, 1893. Serial No. 460,307. (No specimens.)

*To all whom it may concern:*

Be it known that we, JAMES E. THOMAS and ELISHA P. GROW, citizens of the United States, residing at Bay City, in the county of Bay and State of Michigan, have invented certain new and useful Improvements in Aerating Distilled Water; and we do declare the following to be a full, clear, and exact description of the invention, such as will enable others skilled in the art to which it appertains to make and use the same, reference being had to the accompanying drawing, and to the figures of reference marked thereon, which forms a part of this specification.

Our present invention relates to the aeration of distilled water by purified air, and it has for its object the production of a fully aerated water which is free from all germs, bacteria microbes, and other growth, as well as free from deleterious gases.

Our invention consists in the process hereinafter described for aerating distilled water by means of air which has been purified by being subjected to a degree of heat sufficiently high to consume or kill all the living germs, bacteria and the like with which the air may be impregnated.

In order that the nature of our process may be readily understood, we will proceed to describe the same in connection with an apparatus by which said process may be successfully carried out; and this apparatus is shown in the accompanying drawing to which reference is made in connection with the following description.

In the drawing the reference figure 1 denotes the still which contains the water to be distilled for removing all impurities and atmosphere contained therein, which renders aeration necessary for its perfection as a pleasant and healthful potable water.

2, is the aerator which is preferably filled with crushed or disintegrated stone and to the upper end of which the distilled water is led from the still 1, by a pipe 3, and is finely divided in its downward passage through the aerator by the contained stone.

4, represents the air pipe which supplies the air of aeration to the lower end of the aerator. This air pipe before its entry into the aerator, is passed through a heater capable of imparting a heat to the air which passes through the same of at least 300° Fahrenheit more or less, all that is necessary being that it shall be sufficient to destroy or consume all the germs, bacteria and living spores contained in the air and which are liable to grow and propagate when brought into contact with pure water. Any kind of heater may be employed which will give the desired degree of heat, but we propose to coil the air pipe in the dome of a steam boiler 5, or as shown in dotted lines, pass the same through the furnace thereof in close proximity to the fire, as in either event the necessary heat is produced. We prefer however, to coil the pipe in the dome of the boiler thereby furnishing an increased area so that the air passing through the pipe will be subjected for a considerable period of time to the influence of the highly heated surfaces thereof. The air thus purified is carried by its own draft through the pipe 4, and into the bottom of the aerator, and the ascending column of air is then finely divided by the contained stone and brought into intimate contact with the descending water, so that the requisite quantity of purified air is dissolved thereby and a full and complete aeration of the water is obtained.

It is well known that the atmosphere in its usual state is charged with germs and spores of disease and vegetable or animal growth, and which if passed with the air to contact with distilled water, are liable to be taken up and retained by the water and cause a vegetable or animal growth and putrefaction and the object of the process is the removal of these obnoxious and deleterious ingredients. The air, however, before its admission to the aerator and consequently its contact with the distilled water is subjected to a heat of a sufficient degree to effectually destroy all living germs and microbes so that when the air is passed into the aerator it is entirely free from all foreign matter which would be absorbed and cause the water to become impregnated with living animal or vegetable growth, and a pure and wholesome water is thus obtained, which can be bottled or stored free from contact with the atmosphere and kept for years in full purity and perfection.

Having described our invention, what we claim as new, and desire to secure by Letters Patent, is—

The process herein described for producing distilled and aerated water, which consists in distilling and condensing water, directly confining and subjecting atmospheric air for a prolonged period to an independent source of heat of the desired temperature, and combining the said heated air and distilled water in an aerator, substantially as set forth.

In testimony whereof we affix our signatures in presence of two witnesses.

JAMES E. THOMAS.
ELISHA P. GROW.

Witnesses:
JOHN W. McKINNON,
IRA M. COBE.